United States Patent [19]

Cain et al.

[11] 4,007,454
[45] Feb. 8, 1977

[54] APPARATUS FOR REMOTELY DETERMINING THE ANGULAR ORIENTATION, SPEED, AND/OR DIRECTION OF ROTATION OF OBJECTS

[75] Inventors: Charles Cain, Greenville; Arthur T. Shankle, Raleigh, both of N.C.

[73] Assignee: Charles J. Cain, Greenville, N.C.

[22] Filed: Sept. 12, 1975

[21] Appl. No.: 612,684

[52] U.S. Cl. .......................... 340/200; 340/310 A; 340/180
[51] Int. Cl.² ........................................ G08C 19/10
[58] Field of Search .................................. 340/200

[56] References Cited
UNITED STATES PATENTS

| | | | |
|---|---|---|---|
| 3,068,456 | 12/1962 | Nevius | 340/200 |
| 3,222,591 | 12/1965 | Mynall | 340/200 |
| 3,355,806 | 12/1967 | Brook | 340/200 |
| 3,732,553 | 5/1973 | Hardway | 340/200 |
| 3,845,377 | 10/1974 | Shimotori | 340/200 |

*Primary Examiner*—Thomas B. Habecker

[57] ABSTRACT

A rotating electric field is generated in the vicinity of a rotating member, the electric field having an axis of rotation coinciding with the axis of rotation of the member. An electric-field sensing or reading device is positioned at the rotational axis of the electric field and associated therewith for detecting variations therein as the electric field passes the rotating member, and creates an electrical output whose relative phase is dependent upon the angular orientation of the rotating member.

16 Claims, 3 Drawing Figures

DOTTED LINES REPPESENT CIRCUITS ON THE
REAR SIDE OF PRINTED CIRCUIT BOARD

APPARATUS FOR REMOTELY DETERMINING THE ANGULAR ORIENTATION, SPEED, AND/OR DIRECTION OF ROTATION OF OBJECTS

SUMMARY OF THE INVENTION

This invention relates to an improved remote means for determining the angular orientation, speed, and/or direction of rotation of objects such as shafts, dial or meter hands, and the like. More particularly, the invention is concerned with electrically obtaining a signal that is indicative of the angular orientation, speed and direction of rotation of the object to be monitored without altering the interior structure or wiring of a meter or the like. In this regard, this invention embodies a substantial improvement of my prior magnetically induced reading system described in my prior U.S. Pat. No. 3,500,365 issued Mar. 10, 1970.

In electric utility systems, sufficient power-generating equipment must be provided at all times to supply power during relatively short periods of maximum consumption, however much of this equipment otherwise remains idle for a major portion of each day. In order to discourage high power consumption during maximum-demand periods by graduated billing rates, or even to disconnect non-essential portions of a customer's load when the customer exceeds a previously agreed consumption rate compatible with the optimum generating capacity of the utility company, rapid determination of an individual customer's consumption rate, commonly termed "demand" over a prescribed time interval, is necessary.

Heretofore, such demand metering has generally been possible only through the use of specially equipped meters, commonly limited to a fixed time interval and not capable of transmitting information upon demand to a load-monitoring station in time for the station to take corrective action. There has been considerable effort expended in providing means and apparatus for reading meters at a distance, for example through telephone lines and the like. Most of such previous meter readings have required that some internal mechanical or electrical alteration be made to the meter itself and considerable time and expense is involved in putting the altered meter into use. Further, the use of sliding electrical contacts in previous meter reading devices have prevented the use of such devices in explosive atmospheres; and in certain instances, changes in the output signal have been noted due to the aging of the components which can change mechanical and/or electrical characteristics.

Other meter reading devices have used photoelectric cells, so that no mechanical connection is needed between the meter and the meter reader. However, these reading devices have not been satisfactory because a reliable source of light must be provided and the face of the photoelectric cell must be kept sufficiently clean so that the light impinging on the photoelectric cell will not be diminished sufficiently to give a false reading.

With the device described herein, conventional meters can be read by the load-monitoring station with extreme speed permitting the reading of many meters during a short time period, as well as taking several sample readings from each meter to increase the statistical validity of the readings. Thus the utility company can determine not only the total energy consumed by any individual customer during a normal billing period, but can monitor his demand rate during any desired time interval, using any existing meter whether demand-metering equipped or not.

The apparatus of the present invention includes an electrical transducer unit that will indicate the hand position of a meter dial at any particular time without requiring mechanical connection to the meter and without the provisions of unreliable devices such as photoelectric cells. The only connection with the meter is through an electric field. In many cases where the meter is encased in glass, the electric field can pass through the glass casing without tampering with the casing or meter in order to install the transducer of the present invention. In scanning the dial of a meter as hereinafter described, a rotating electric field can be induced without using mechanical parts that must move relative to one another, thereby reducing areas of possible trouble with the meter reading device. There are no spark producing switches involved with the device according to the present invention, and therefore the device can be used in explosive atmospheres.

Whereas the device described in my previous U.S. Pat. No. 3,500,365 uses a plurality of field-producing coils to generate a rotating magnetic field, and utilizes a reading coil in the center of the field producing coils, the apparatus according to the present invention substitutes an electric field for the magnetic field. In this regard, the field producing coils are replaced by electrodes with diametrically opposite pairs of electrodes being connected to successive phases of a polyphase voltage source in such a manner as to produce a rotating electric field around the array of peripheral electrodes. In a similar manner, the reading coil is replaced by an electrode at the same central location. Any other type of electric field sensing device such as a suitable transistor could be used. The reading electrode is connected to a voltage detector in such a way that the timing or phase of the electric field in the vicinity of the reading electrode can be monitored.

Such a device provides several advantages over the magnetic version described in my prior U.S. Pat. No. 3,500,365. First of all, the electrical field device is simpler and cheaper to construct since the relatively expensive coils are avoided. A smaller physical size is also possible by eliminating the coils, and in utility-meter reading applications, the smaller physical size provides less obstruction to visual checks of the dial reading. Less electrical power is required since the electric field can be generated with less current than can the magnetic field. Along the same line, since less field is required with the electric field to monitor the position of the object than with the magnetic field, the chance of influencing the meter or device to be read by a strong field is thereby minimized. The rotatable member of the present invention does not have to be magnetically conducting, as was the case with the prior device. The apparatus according to the present invention will work with any metal, ceramic, plastic, or other rotating member, such as a meter hand, whose dielectric constant differs significantly from that of the surrounding medium, whether the medium be air, another gas, or a liquid.

These and other features and advantages of the present invention will become apparent from the following specification when taken in conjunction with the accompanying drawings, in which.

In general terms, the present invention includes means for providing a rotating electric field with a reading means at the center of rotation of the electric field. Normally there would be no signal induced in the reading means, because the vector sum of all voltages read by the reading means from all points is zero voltage. However, when placed in front of a meter dial or other rotating member so that the voltage detector or reading means is aligned with the meter shaft, a different result occurs. The meter hand, whose dielectric constant differs from that of the surrounding medium, provides a pathway between the meter hand tip position and the reading means. When the electric field passes the meter hand or rotating member, the material of the meter hand provides a pathway (capacitive coupling) to the reading means, which then exhibits a sinusoidal voltage whose phase (relative to the input phase) is directly proportional to the angular position of the meter hand. The signal can then be monitored by any of several well known means so as to indicate the angular orientation of the rotating member or meter hand, or if desired, to indicate the speed and/or direction of rotation of the rotating member about its axis of rotation.

Figure 1:
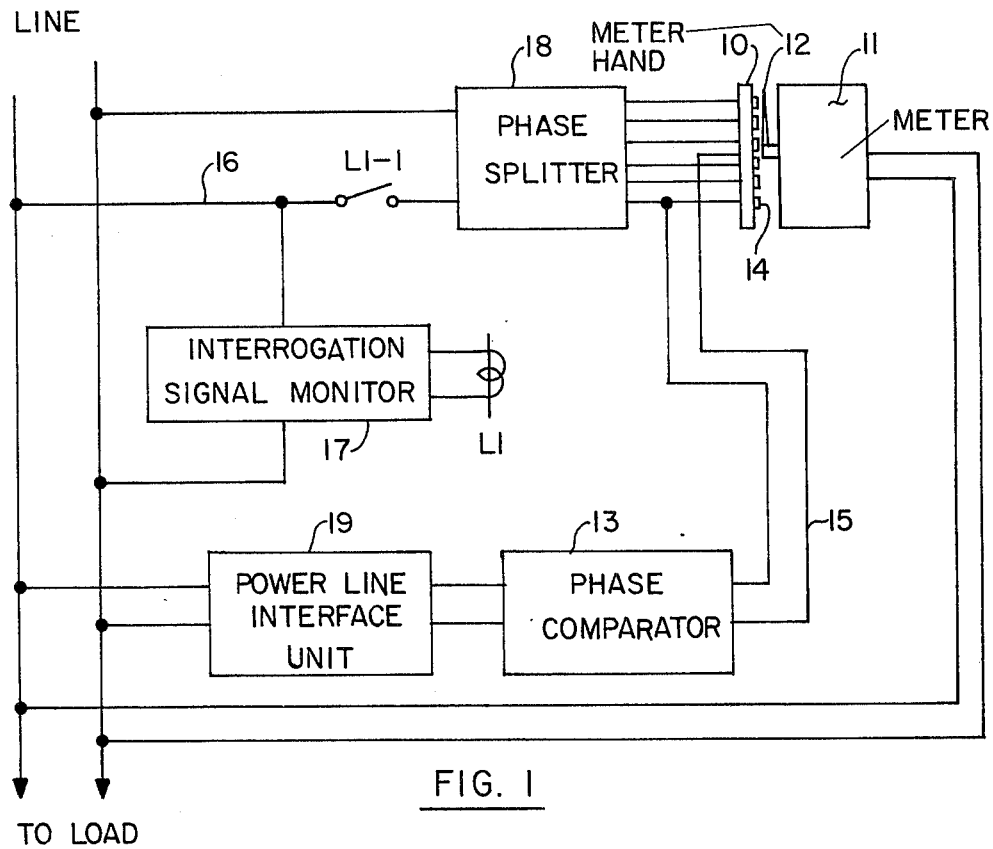
FIG. 1 is a schematic diagram showing a transducer according to the present invention in conjunction with the control circuit and a recording circuit therefor.

Referring now to FIG. 1 of the drawings, a transducer generally designated at 10 is positioned adjacent the face of a meter 11 having a hand 12. A reading means 14 in the form of an electrode, or other electric field sensing device, such as a transistor, is positioned at the center of the transducer 10, the reading means being connected to the wire 15 in which there is a phase comparison circuit 13 of conventional and well-known design.

The transducer 10 is also positioned so that the axis of rotation of the electric field coincides with the axis of rotation of the meter hand 12.

It will be understood that the wire 16 is from a source of electrical voltage (generally single-phase), such as an electric power line or the like. A signal monitoring device 17 of conventional design is arranged so as to ignore routine voltage changes occurring on wire 16 but to detect special voltage patterns (which may be superimposed thereon by the remote station and which constitute a request for a meter reading) and respond thereto by closing a switching device such as is represented by relay L1. With this arrangement the relay L1 or other switching device can be remotely energized to activate the transducer 10.

The wire 16 leads to a phase splitter 18. The phase splitter 18 converts the single phase voltage into a plurality of phases, for example, three phases to provide the rotating electric field.

It will thus be seen that, when it is desired to read the meter 11, an interrogation signal is placed on the wire 16 which causes the signal monitor to energize the relay contact L1-1. When the contact L1-1 is closed, the single phase voltage through wire 16 which will be split by the phase splitter into a polyphase voltage, for example, as illustrated a three-phase voltage. As an inherent feature of properly connected polyphase voltage, an electric field will be generated that will rotate around the face of the transducer 10. When the rotating field crosses, or becomes parallel to, the dial hand 12, a voltage change will be induced in the reading means 14 from what would ordinarily be expected, to give an indication that the dial hand has been scanned. It is not necessary that the hand 12 be magnetized, or even electrically conductive, as long as the dielectric constant of the material from which the hand 12 is formed differs significantly from that of the surrounding medium. Generally, any material will work, such as metal, ceramic, or plastic.

Figure 2:
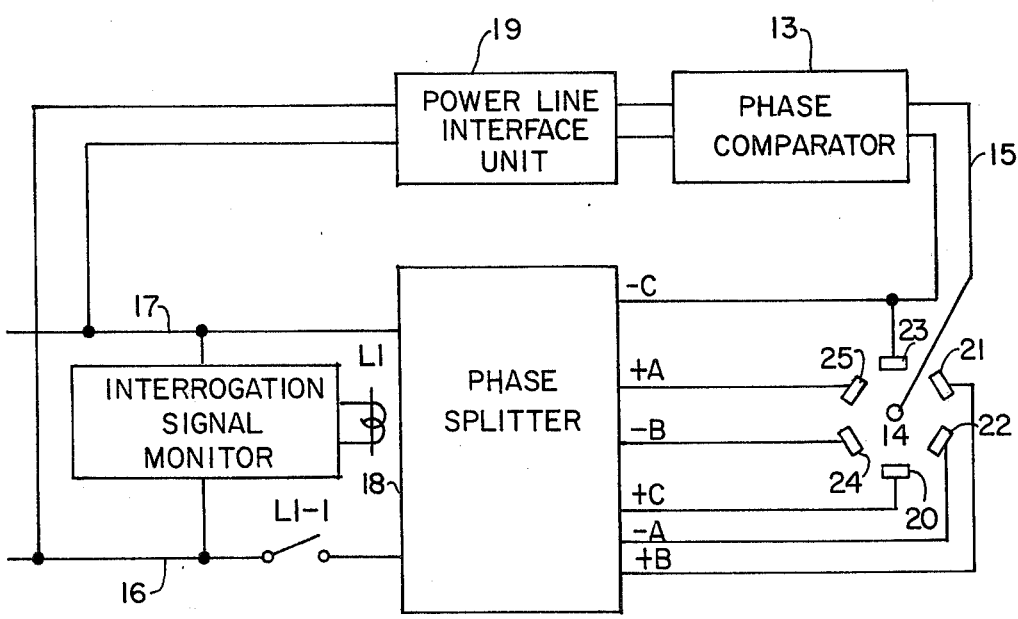
FIG. 2 is a schematic wiring diagram showing the connection of the transducer with the reading circuit.

Referring now to FIG. 2 of the drawings for a more detailed discussion of the circuit, it will be seen that the wire 16 is connected through relay contact L1-1 to the phase splitter 18. The details of the phase splitter 18 are not shown herein, this being a conventional apparatus, well known by those skilled in the art, it being understood, however, that the phase splitter 18 can provide polyphase voltage, that is, voltage of two-phase, three-phase, or any other number of phases. Three-phase voltage is, perhaps, preferable because three-phase voltage will frequently be available from the conventional power line so that the phase splitter 18 will not be required. If three-phase voltage is available from the power line, there will be three contacts such as contact L1-1, one of the contacts being in each of the three phase wires, and the phase-splitter 18 will be replaced by three phase-inverters so that the input to the transducer 10 will consist of the three original phases and their inversions.

The six lines coming from the phase-splitter 18 are designated A, B, C, −A, −B, and −C, which will also designate the positive and negative polarities of the three phases: phase A, phase B, phase C. It will be observed that wire A is connected to electrode 25, and wire −A to electrode 22, these two electrodes being diametrically opposed on transducer 10. Similarly, wire B is connected to electrode 21 and wire −B to the diametrically opposed electrode 24, and likewise wire C is connected to electrode 20 and wire −C to the diametrically opposed electrode 23. The diametrically opposed electrode pairs 20, 23; 21, 24; and 22, 25, are each wired with one electrode, e.g. 20, connected to the positive side of one phase (e.g. phase C), while the other electrode, e.g. 23, is connected to the negative side of the same phase. Therefore a voltage both electrodes will cause opposite polarity on each of the two electrodes of the electrode pair, so that an electric field will be provided between each electrode pair 20, 23; 21, 24; and 22, 25.

With this arrangement, it will be understood by those skilled in the art that, when phase C reaches its peak voltage, there will be an electric field between the electrodes 20 and 23, one of the electrodes being positively charged and the other being negatively charged. A hundred and twenty (120°) electrical phase degrees later, when phase B reaches its peak voltage, there will be a strong electric field between the electrodes 21 and 24, one of the electrodes being positively charged and the other being negatively charged; and, the same situation will be true for the electrodes 22, 25 when phase A reaches its peak voltage. Thus a rotating electric field is provided.

At the geometric center of the peripheral electrodes 20–25 and aligned with the axis of rotation of the hand 12 is positioned the reading means 14 in the form of an electrode or other electric field-sensitive device, such as a suitable transistor. Electrically speaking, then, the meter hand 12 "samples" the electric field at the position of its tip, provides a capacitive coupling between this position and the central electrode, which then experiences a voltage whose phase (relative to the phase of the voltage applied to any electrode) is directly proportional to the angular position of the meter hand. In some applications of the invention, other than reading utility meters, it may be desirable to measure the speed and/or the direction of movement of the rotating member. In such cases the sine-wave output of the central electrode will be distorted, and the speed and direction of the rotating object can be deduced from the amount and shape of the distortion.

Figure 3:
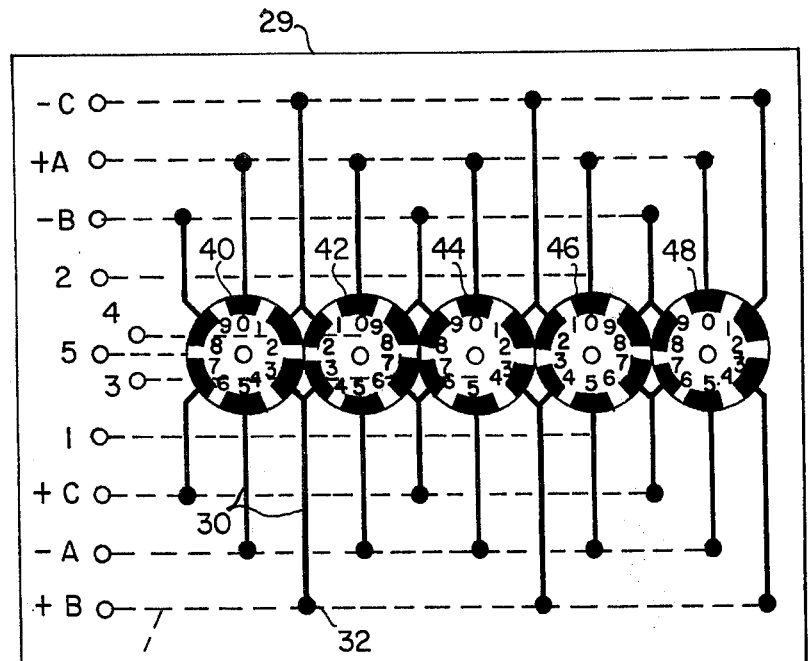
FIG. 3 is a front view of a transducer similar to that shown schematically in FIGS. 1 and 2, except arranged to read a meter having five dials.

Transducer 10 is more clearly shown in FIG. 3, which is schematically illustrative of a device for reading a meter having five dials. A backing plate 29 in the preferred form of a printed circuit plate includes five sets 40, 42, 44, 46, 48 of circularly arranged electrodes 20–25 on the face thereof, each set corresponding to one of the meter dials. The small numbers 0–9 on the face of each set of electrodes is representative only of the corresponding meter dial face (not shown) adjacent which the electrodes are positioned. A printed conductor line or lead 30 extends from each electrode 20–25 to one of a plurality of punch through connectors 32 which, in turn, are connected to one of the common leads or lines designated +A, +B, +C, −A, −B, −C indicating the phase of the incoming voltage and printed on the rear side of plate 29. Finally, each of the reading electrodes 14 printed on the face of the plate 29 are connected to one of the leads 1, 2, 3, 4, 5 on the rear side, each of which can be a switching device be sequentially connected to the phase-comparison circuit 13 through a wire 15. In FIG. 3, a solid line represents a conducting path on the face of plate 29, while a broken line represents a conducting path on the rear side.

With the above-described arrangement, it will be seen that normally the electrical field will take a rather wide circuit from one of the electrodes (say electrode 20) to the diametrically opposed electrode (electrode 23). When the dial hand 12 is positioned adjacent electrode 20, for example, the electrical field will pass therethrough, and as a result of the presence of the material of hand 12, a voltage will be induced in the reading means 14. This change in voltage can be readily monitored by known techniques to either indicate the angular position, the speed, or direction of rotation of hand 12. Of particular importance is the phase difference (time lag between peak voltages) between the voltage induced in reading means 14 and the voltage applied to any given one of the electrodes 20–25. This phase difference, measured by the conventional phase comparator circuit 13, will be indicative of the angular orientation of the hand 12 with respect to any convenient fixed reference direction (e.g. with respect to the radial line joining reading electrode 14 with electrode 23), and can be placed on the power line by the conventional interface unit 19 to be received by billing equipment at the interrogating location.

There is thus provided an improved apparatus for remotely determining the angular orientation, speed, and/or direction of rotation of objects by means of a rotating electrical field. It will, of course, be understood that the particular embodiments here presented are by way of illustration of the rotating electric field type meter reading apparatus, and are meant to be in no way restrictive. For example, backing plate 29 could be provided with only one electrode and the backing plate rotated with a stationary electrode positioned at the 12 o'clock position, similar to the embodiment shown in FIG. 5 of my former U.S. Pat. No. 3,500,365. Numerous other changes and modifications could be made, and the full use of equivalents resorted to, without departing from the spirit or scope of the invention.

What is claimed is:

1. An apparatus for remotely monitoring the angular position, speed, and/or direction of rotation of a member as it rotates about an axis of rotation and defines a circumferential path comprising:
   a. means for generating a rotating electric field which defines a path parallel to said circumferential path of the rotating member and includes said circumferential path therein;
   b. a reading electrode means fixedly positioned within said electric field and symmetrically placed with respect to said axis of rotation for sensing a voltage change responsive to the crossing of said rotating member by said rotating electric field and emitting an output signal responsive to said voltage change; and
   c. said means for generating the rotating electric field and said reading electrode both being positioned in confronting, spaced relation to, but in no way mechanically or electrically connected to said rotating member other than that a portion of said rotating member is within the path of said rotating electric field.

2. The apparatus according to claim 1 wherein said reading electrode means is positioned at the center of said rotating electric field.

3. The apparatus according to claim 1 wherein said means for generating a rotating electric field comprises:
   a. source of polyphase voltage;
   b. a plate positioned in spaced, confronting, parallel relation to said circumferential path;
   c. a plurality of exciting electrodes defining a circular array around a center point aligned with said axis of rotation of said rotating member, successive electrodes being connected to successive phases of said polyphase voltage.

4. The apparatus according to claim 3 wherein said reading electrode means is positioned in substantially the same plane as said plurality of electrodes which define said circular array.

5. The apparatus according to claim 1 wherein said means for generating a rotating electric field comprises:
   a. source of polyphase voltage;
   b. a plate positioned in spaced, confronting parallel relation to said circumferential path;
   c. a plurality of exciting electrodes defining a circular array around a center point aligned with said axis of rotation of said rotating member, successive diametrically opposed pairs of said electrodes being connected to successive phases of said polyphase voltage source, one electrode of each pair connected to the positive side of the corresponding voltage phase and the other electrode of said pair being connected to the negative side of the corresponding voltage phase.

6. The apparatus according to claim 5 wherein said reading electrode means is positioned in substantially the same plane as said plurality of electrodes which define said circular array.

7. System for determining the angular position, speed, and/or direction of rotation of the member as it rotates about an axis of rotation and defines a circumferential path comprising:
  a. source of polyphase voltage;
  b. transducer means for receiving said polyphase voltage and generating a rotating electric field which defines a path parallel to said circumferential path, said transducer means further including a reading electrode means fixedly positioned within said rotating electric field and symmetrically placed with respect to said axis of rotation for sensing a voltage change responsive to the crossing of said rotating member by said rotating electric field and emitting an output signal responsive to said voltage change;
  c. said transducer means being positioned in confronting, spaced relation to, but in no way mechanically or electrically connected thereto other than that a portion of said rotating member is within the path of said rotating electric field;
  d. comparator means receiving a sample of the applied voltage from said source of polyphase voltage and said signal emitted from said reading electrode means, and translating the phase difference of said two signals into an electrical signal indicative of the position of said rotating member.

8. The apparatus according to claim 7 wherein said transducer means comprises:
  a. a plate positioned in spaced, confronting, parallel relation to said circumferential path;
  b. a plurality of exciting electrodes arranged in a circular array symmetrically positioned with respect to said axis of rotation, successive ones of said electrodes being connected to successive phases of said polyphase voltage.

9. The apparatus according to claim 8 wherein said reading electrode means is positioned in substantially the same plane as defined by said circular array of exciting electrodes.

10. The apparatus according to claim 7 wherein said transducer means comprises:
  a. a plate positioned in spaced, confronting, parallel relation to said circumferential path;
  b. a plurality of exciting electrodes arranged in a circular array symmetrically positioned with respect to said axis of rotation, successive diametrically opposed pairs of said exciting electrodes being connected to successive phases of said polyphase voltage source, one electrode of each pair connected to the positive side of the corresponding voltage phase and the other electrode of said pair being connected to the negative side of the corresponding voltage phase.

11. The apparatus according to claim 10 wherein said reading electrode means is positioned in substantially the same plane as defined by said circular array of exciting electrodes.

12. System for reading utility meters of the type having a plurality of dials encased in a glass front housing, each of said dials having a hand which rotates about an axis of rotation defining a circumferential path and visually indicating one digit of the number signifying the amount of consumption of the utility, said system comprising:
  a. a source of polyphase voltage;
  b. transducer means attached to said housing adjacent said glass front in confronting, spaced relationship to said plurality of dials, but mechanically and electrically unconnected thereto;
  c. said transducer means receiving said polyphase voltage and generating a plurality of rotating electric fields, each of which defines a path parallel to and including therein said circumferential path of the corresponding rotating hand, said transducer means further including a reading electrode means fixedly positioned within each of said rotating electric fields and symmetrically placed with respect to the axis of rotation of the corresponding meter hand for sensing a voltage change responsive to the crossing of said rotating hand by said rotating electric field and emitting an output signal responsive to said voltage change;
  d. comparator means successively receiving samples of the applied voltage from said source of polyphase voltage and said signal emitted from each of said reading electrode means, and translating the phase difference of said two signals into an electrical signal indicative of the position of each of said meter hands.

13. The system for reading utility meters according to claim 12 wherein said transducer means comprises a plate extending parallel to said circumferential path and including thereon a plurality of circular arrays of exciting electrodes, each of said circular arrays being arranged around a center point aligned with the axis of rotation of one of said meter hands, successive electrodes being connected to successive phases of said polyphase voltage.

14. The system for reading utility meters according to claim 13 wherein said reading electrode means comprises a sensing electrode corresponding to each of said circular arrays and positioned in substantially the same plane defined by its corresponding circular arrays of electrodes.

15. The system for reading utility meters according to claim 11 wherein said transducer means comprises a plate extending parallel to said circumferential path and a plurality of circular arrays of exciting electrodes attached to said plate, each of said circular electrode arrays extending around a center point aligned with the axis of rotation of one of the electric meter hands, successive diametrically opposed pairs of said electrodes connected to successive phases of said polyphase voltage source, one electrode of each pair connected to the positive side of the corresponding voltage phase and the other electrode of said pair being connected to the negative side of the corresponding voltage phase.

16. The system for reading utility meters according to claim 15 wherein said reading electrode means comprises a sensing electrode corresponding to each of said circular arrays and positioned in substantially the same plane defined by its corresponding circular arrays of electrodes.

* * * * *